US007368070B2

(12) United States Patent
Akimoto et al.

(10) Patent No.: US 7,368,070 B2
(45) Date of Patent: May 6, 2008

(54) CONDUCTIVE PASTE FOR TERMINAL ELECTRODE OF MULTILAYER CERAMIC ELECTRONIC PART

(75) Inventors: Yuji Akimoto, Fukuoka (JP); Megumi Kawahara, Akishima (JP); Tomoko Uchida, Hachioji (JP)

(73) Assignee: Shoei Chemical Inc., Tokyo (JP)

( * ) Notice: Subject to any disclaimer, the term of this patent is extended or adjusted under 35 U.S.C. 154(b) by 597 days.

(21) Appl. No.: 11/091,135

(22) Filed: Mar. 28, 2005

(65) Prior Publication Data

US 2005/0219789 A1    Oct. 6, 2005

(30) Foreign Application Priority Data

Mar. 30, 2004    (JP)    ............................. 2004-098011

(51) Int. Cl.
*H01B 1/16*    (2006.01)
(52) U.S. Cl. .................................................... 252/512
(58) Field of Classification Search ................ 252/512; 428/403
See application file for complete search history.

(56) References Cited

U.S. PATENT DOCUMENTS

| 5,781,402 A | 7/1998 | Fujiyama et al. |
| 6,060,165 A | 5/2000 | Asada et al. |
| 2003/0178604 A1* | 9/2003 | Okada et al. ............... 252/500 |

FOREIGN PATENT DOCUMENTS

| JP | 04-345701 | 12/1992 |
| JP | 8-180731 | 7/1996 |
| JP | 10-330802 | 12/1998 |
| JP | 2001-237137 | 8/2001 |
| JP | 2001-338830 | 12/2001 |
| JP | 2001 338830 A | 12/2001 |
| JP | 2001-338831 | 12/2001 |
| JP | 2002-56717 | 2/2002 |
| JP | 2002-056717 | 2/2002 |
| JP | 2002 056717 A | 2/2002 |
| JP | 2003-016832 | 1/2003 |
| JP | 2003-243249 | 8/2003 |
| KR | 2001 001 640 A | 1/2001 |

\* cited by examiner

*Primary Examiner*—Mark Kopec
(74) *Attorney, Agent, or Firm*—Flynn, Thiel, Boutell & Tanis, P.C.

(57) ABSTRACT

A conductive paste for a terminal electrode of a multilayer ceramic electronic part, comprising (A) a spherical conductive powder which comprises chiefly copper, and which has a vitreous thin film on at least a portion of the surfaces thereof, (B) a flaky conductive powder comprising chiefly copper, (C) a glass powder, and (D) an organic vehicle, and may further contain (E) an aliphatic amine. When baked to form terminal electrodes for multilayer ceramic electronic parts, this paste exhibits extremely superior binder removal characteristics at low temperatures, and furthermore, it is superior in terms of oxidation resistance, binder removal characteristics and firing characteristics with no need for strict control of the firing conditions, thereby dense terminal electrodes that are superior in terms of adhesion and conductivity can be formed.

6 Claims, No Drawings

CONDUCTIVE PASTE FOR TERMINAL ELECTRODE OF MULTILAYER CERAMIC ELECTRONIC PART

BACKGROUND OF THE INVENTION

1. Field of the Invention

The present invention relates to a conductive paste for forming terminal electrodes of multilayer ceramic electronic parts such as multilayer ceramic capacitors, multilayer ceramic inductors, laminated type piezoelectric elements and the like. In particular, the present invention relates to a conductive copper paste suitable for forming terminal electrodes of multilayer ceramic electronic parts that have base metal internal electrodes made of nickel or the like.

2. Description of the Prior Art

Multilayer ceramic electronic parts, e. g., multilayer ceramic capacitors, are generally manufactured as follows. An internal electrode conductive paste is printed in a specified pattern on a dielectric ceramic green sheet such as a barium titanate ceramic or the like. Several individual sheets of this type are laminated, and are pressed together, thus producing an unfired laminate in which ceramic green sheet layers and internal electrode paste layers are alternately laminated. The laminate thus obtained is cut into chips of a specified shape, and these chips are then co-fired at a high temperature, thus producing multilayer ceramic capacitor bodies. Next, the end surfaces of each ceramic capacitor body on which the internal electrodes are exposed are coated by dipping or the like with a terminal electrode conductive paste consisting chiefly of a conductive powder, a glass powder and an organic vehicle; then, following drying, terminal electrodes are formed by firing at a high temperature. Subsequently, a plating layer of nickel, tin or the like is formed (if necessary) on top of the terminal electrodes by electroplating or the like.

Conventionally, noble metals such as palladium, silver-palladium, platinum and the like have been used as internal electrode materials. However, because of requirements in terms of resource conservation, cost reduction and prevention of delamination and cracking caused by oxidation expansion during the firing of palladium or silver-palladium, base metals such as nickel, cobalt, copper and the like now constitute the mainstream of such materials. Accordingly, copper, nickel, cobalt or alloys of these metals which allow the ready formation of good electrical connections with base metal internal electrodes are also used instead of silver or silver-palladium as terminal electrode materials.

In cases where base metals are thus used in internal electrodes and terminal electrodes, the firing of the terminal electrodes is ordinarily performed at a maximum temperature of 700 to 900° C. in a non-oxidizing atmosphere with an extremely low oxygen partial pressure, e. g., an inert gas atmosphere containing several ppm to several tens of ppm of oxygen.

However, in cases where (in particular) a terminal electrode conductive paste consisting chiefly of copper is fired in such an atmosphere containing little oxygen, organic components such as binder resins, solvents and the like used as vehicles tend not to be decomposed by oxidation; accordingly, the appropriate combustion, decomposition and removal (also called "binder removal") of the organic components is difficult to perform in an appropriate manner. Specifically, in the initial stage of firing which is performed at a relatively low temperature, unless binder removal is sufficiently performed prior to the occurrence of the fluidization of the glass and sintering of the copper powder, a carbon and carbonaceous organic residues such as vehicle decomposition products or the like will be enclosed in the film following the initiation of sintering. Such enclosed carbon and carbonaceous organic residues (hereafter referred to as "residual carbon" in some cases) leads to various problems in subsequent high-temperature stages, causing a loss of characteristics by the electronic parts, and lowering the reliability of such parts. For example, in the stage in which the copper powder is sintered at a high temperature, carbon remaining in the film impedes the fluidization of the glass and sintering of the copper, so that the fine dense texture of the electrode and adhesion to the ceramic body are impaired. Furthermore, such residual carbon captures oxygen from the dielectric ceramic, thus creating an oxygen deficiency so that the dielectric characteristics are caused to deteriorate, and so that the strength of the ceramic body is also caused to drop. As a result of such a drop in the strength of the ceramic body, cracking of the ceramic body caused by thermal shock (thermal cracking) occurs in the subsequent soldering process or the like. Furthermore, when the sealed-in residual carbon is converted into a gas at high temperatures, blisters (bubbles) are formed so that the texture of the sintered film is impaired. As a result, when a plating treatment is subsequently performed on the sintered film, the plating solution penetrates into the electrode film, causing a drop in the insulation resistance and cracking of the ceramic body; furthermore, the penetrating plating solution is heated during solder reflow and converted into a gas, thus leading to "solder sputtering", which cause the molten solder to scatter.

Accordingly, the question of how to efficiently achieve binder removal in the initial stage of firing, so that the residual carbon can be reduced prior to the sintering of the copper powder in a high-temperature region, has been an important problem in terminal electrode conductive pastes that consist chiefly of base metals (especially copper).

Conventionally, in order to solve this problem, methods using a resin with good thermal decomposition characteristics such as an acrylic resin or the like as the binder resin, or methods using a glass having characteristics which are such that the glass tends not to soften at low temperatures, but rather softens following the removal of the vehicle, so that the texture of the electrode is made finer, have been employed.

Furthermore, terminal electrode pastes using a fine spherical copper powder form excessively dense films when applied and dried; accordingly, it appears that the vehicle tends not to be driven off, and that carbon remains up to high temperatures. Accordingly, the use of a flaky copper powder instead of a spherical copper powder has been proposed. For example, Japanese Patent Publication No. 8-180731A discloses a multilayer ceramic capacitor terminal electrode paste that contains a flaky copper powder, a spherical copper powder, a glass powder and an organic vehicle. Such a flaky copper powder creates appropriate spaces in the dried film of the paste; it appears that these spaces act as gas venting paths, so that binder removal can be smoothly performed in structural terms. Furthermore, in Japanese Patent Publication No. 2002-56717A, it is indicated that the binder removal characteristics can be improved without sacrificing the paste applying characteristics and fine texture of the film by setting the dry film density of the paste in a specified range.

Meanwhile, in order to perform binder removal efficiently, there are also methods in which the oxidative decomposition of organic material is accelerated by raising the oxygen concentration to several hundred ppm or higher in a temperature region of (for example) approximately 200 to 600° C. prior to the densification of the electrodes in the temperature elevation process at the time of firing, and then lowering the oxygen concentration and performing firing. For example, Japanese Patent Publication No. 10-330802A and Japanese Patent Publication No. 2001-338831A disclose methods in which a fine spherical copper powder is covered with an oxidation-resistant coating consisting of glass or the like, the binder removal process is performed in an atmosphere with a high oxygen partial pressure such as the atmosphere or the like, so that the vehicle is decomposed while preventing oxidation of the copper, and firing is then performed after lowering the oxygen partial pressure.

In recent years, there have been increasingly strict requirements for increased capacity, improved performance and improved reliability in multilayer ceramic electronic parts. Especially in the case of small-size large-capacity multilayer ceramic capacitors, the spacing between the internal electrodes is narrow, i. e., 1 to 2 μm, so that a defective capacitance tends to be generated unless the terminal electrodes are dense and finely textured. Accordingly, there is a need to perform binder removal more smoothly, and to form a denser and more finely textured final fired film that is free of oxidation. However, in cases where the terminal electrode conductive paste used is a copper conductive paste, reduction of the amount of residual carbon (excellent binder removal characteristics) and prevention of the oxidation of the copper are mutually conflicting objects which are such that one of these characteristics deteriorates if an attempt is made to improve the other, and if either of these characteristics is poor, a good electrode cannot be formed. In addition, the effect of residual carbon on the sintering of copper is also great, so that it is extremely difficult to satisfy the above-mentioned requirements regardless of the conventional method that is used.

For example, in the case of methods in which binder removal is performed as described above in an atmosphere with a high oxygen partial pressure after covering the surfaces of the copper powder with a glass coating, and firing is then performed after lowering the oxygen partial pressure, the anti-oxidation effect and binder removal characteristics in the low-temperature region are superior; however, atmosphere adjustment in the high-temperature region is difficult, so that it is difficult to perform firing without ultimately oxidizing the copper powder.

Conversely, however, in cases where binder removal is performed in a low-oxygen atmosphere with an oxygen partial pressure of several tens of ppm or less, the binder removal at low temperatures tends to be incomplete even if the film is formed with a structure that allows easy gas venting by using a flaky copper powder. This tendency is especially conspicuous in cases where the oxygen concentration in the firing atmosphere is a few ppm or less, or in cases where the number of chips simultaneously fired is large. Furthermore, in order to improve dispersion and prevent oxidation, flaky metal powders are ordinarily subjected to a surface treatment with fatty acid or its metal salt such as stearic acid or the like; however, according to research conducted by the present inventors, the presence of such substances contributes to blistering and deterioration of the ceramic body.

Furthermore, in the case of firing in such a low-oxygen atmosphere, it is extremely difficult to achieve strict control of the oxygen partial pressure to a value on the order of ppm, and to maintain the atmosphere at a fixed concentration. Specifically, when organic material contained in the paste decomposes, oxygen is captured from the atmosphere so that a reducing atmosphere is created, and metal oxidation-reduction occurs, so that the oxygen concentration shows a slight variation. Accordingly, the ease of binder removal and the degree of oxidation of the copper also vary according to slight differences in the ceramic body, the size of the chips, the quantity of chips fired at the same time, the organic composition in the paste, and the firing conditions such as the oxygen concentration, peak temperature, temperature profile and the like. Furthermore, since the amount of carbon that remains up to the high-temperature region in the firing process varies greatly according to the number of chips fired at the same time and the shape of these chips, it is especially difficult to obtain a stable local oxygen partial pressure in the vicinity of the bodies being fired. As a result, the characteristics fluctuate greatly so that there is considerable dispersion in the results.

However, according to electronic part standards and makers, there are currently differences in the types of ceramics and firing conditions used, so that there is a need for a paste with a wide process window which makes it possible to obtain terminal electrodes with superior characteristics in a stable manner under various firing conditions.

SUMMARY OF THE INVENTION

It is an object of the present invention to solve all of the above-mentioned problems, and to provide a terminal electrode copper conductive paste [i] which shows extremely little oxidation of copper and at the same time shows superior binder removal properties at low temperatures when baked onto multilayer ceramic electronic parts, especially in cases where firing is performed in a low-oxygen atmosphere with an oxygen partial pressure of a few tens of ppm or less via a binder removal process and a high-temperature firing process, [ii] which does not cause any blistering or deterioration of the ceramic body, and [iii] which can form a dense, highly conductive fired film with no penetration by the plating solution or faulty connections with the internal electrodes.

In particular, furthermore, it is an object of the present invention to provide a copper conductive paste which has little susceptibility to the firing temperature or oxygen concentration in the firing atmosphere, and which can be applied to a wide variety of different types of ceramic bodies and cope with variations in the firing conditions.

In order to achieve the above-mentioned objects of the present invention, the present invention comprises the constructions described below.

(1) A conductive paste for a terminal electrode of a multilayer ceramic electronic part, comprising (A) a spherical conductive powder which comprises chiefly copper, and which has a vitreous thin film on at least a portion of the surfaces thereof, (B) a flaky conductive powder comprising chiefly copper, (C) a glass powder, and (D) an organic vehicle.

(2) A conductive paste for a terminal electrode of a multilayer ceramic electronic part, comprising (A) a spherical conductive powder which comprises chiefly copper, and which has a vitreous thin film on at least a portion of the surfaces thereof, (B) a flaky conductive powder comprising chiefly copper, (C) a glass powder, (D) an organic vehicle, and (E) an aliphatic amine.

(3) The conductive paste according to the above-mentioned (2), wherein at least a portion of the above-mentioned (E) aliphatic amine is adsorbed on the surfaces of the (B) flaky conductive powder particles.

(4) The conductive paste according to the above-mentioned (2) or (3), wherein the amount of the (E) aliphatic amine is 0.05 to 2.0 wt % based on the weight of the (B) flaky conductive powder.

(5) The conductive paste according to any of the above-mentioned (1) through (4), wherein the weight ratio of the (A) to (B) is in the range of 5:95 to 95:5.

The terminal electrode conductive paste of the present invention is conspicuously superior in terms of oxidation resistance, binder removal characteristics and firing characteristics, and can form dense terminal electrodes with superior adhesive strength and conductivity.

Accordingly, even in cases where firing is performed in an inert atmosphere with a low oxygen partial pressure, there is no deterioration in the electrical characteristics of the ceramic body due to residual carbon or the like, and no occurrence of thermal cracking caused by a deterioration in the mechanical strength. Furthermore, highly reliable multilayer ceramic electronic parts that show superior characteristics after high-temperature load life tests can be manufactured. Moreover, dense electrode films that are free of blistering can be formed, so that there is no penetration by the plating solution in the plating process following firing, and therefore no cracking or drop in the insulation resistance, and no solder sputtering. Furthermore, there is likewise no increase in the resistance of the terminal electrodes caused by oxidation of the copper, no insufficient capacitance caused by faulty joining with the internal electrodes, and no deterioration in the platability or the like.

Furthermore, as a result of using a specified conductive powder and a specified dispersing agent, the paste of the present invention has little susceptibility to the firing conditions, and can cope with various types of different firing conditions such as firing atmosphere (especially oxygen concentration), firing temperature, profile and the like. Furthermore, the present invention can be applied to various types of ceramic bodies with different compositions and characteristics. Moreover, since strict control of the firing conditions is unnecessary, the process can be simplified, the production efficiency can be improved, and the cost can be reduced.

DETAILED DESCRIPTION OF THE PREFERRED EMBODIMENTS

The spherical conductive powder (A) used in the present invention, which comprises chiefly copper, and which has a thin vitreous film on at least a portion of the powder surfaces, is formed by coating a spherical metal powder comprising chiefly copper with a thin vitreous substance (or otherwise causing this thin vitreous substance to adhere to the powder). Besides pure copper powders, alloys consisting chiefly of copper, e. g., alloys containing copper and at least one metal selected from a group consisting of gold, silver, palladium, platinum, nickel, rhodium, cobalt, iron and the like, can also be used as spherical metal powders comprising chiefly copper. (Below, such powders will be referred to collectively as "spherical copper powders"). A powder whose average particle diameter $D_{50}$ (including the vitreous thin film) as determined by a laser diffraction particle size analyzer is approximately 0.1 to 10 µm is used as this spherical copper powder.

While the vitreous thin film is present as a solid phase on the surfaces of the copper powder, this film functions as a protective layer against oxidation of the metal and a layer that prevents sintering. The individual particles that make up the spherical copper powder need not be completely covered by the vitreous material. However, a powder in which the surfaces are uniformly covered thereby is desirable. The amount of the vitreous thin film is preferably 0.01 to 50 wt %, and even more preferably 0.1 to 10 wt %, based on the weight of the spherical copper powder.

Such a powder may be manufactured by any desired method, such as a method in which a vitreous thin film is deposited by vapor deposition on the spherical copper powder, or a method in which the powder is coated using a sol-gel process or the like. However, in order to form an extremely thin vitreous film with a uniform thickness over the entire surfaces of the individual copper particles, it is desirable to manufacture this powder using the method described in Japanese Patent Publication No. 10-330802A, i. e., a method in which a solution containing at least a thermally decomposable copper compound and an oxide precursors which undergoes thermal decomposition to produce a vitreous material that does not form a solid solution with the above-mentioned metal is formed into fine droplets, and a vitreous material is deposited on the vicinity of the surfaces of the above-mentioned copper powder at the same time that the copper powder is produced, by heating these liquid droplets to a temperature that is higher than the decomposition temperature of the above-mentioned metal compound.

The vitreous thin film may be any vitreous material having a glass transition point and glass softening point which are such that the glass is softened and fluidized during firing in the high-temperature region following binder removal; this vitreous thin film may be amorphous, or may contain crystals in an amorphous film. Furthermore, the composition of this vitreous thin layer may be the same or different as that of the glass powder mixed with the paste as an inorganic binder; however, it is desirable that this vitreous thin film be one that is not softened or fluidized until at least the decomposition temperature of the vehicle during the firing of the paste, and that is softened and fluidized following binder removal so that this glass acts as a sintering aid. Examples of types of glass that can be used include $BaO$—$ZnO$—$B_2O_3$ type, $BaO$—$ZnO$ type, $BaO$—$SiO_2$ type, $BaO$—$ZnO$-$SiO_2$ type, $BaO$—$B_2O_3$—$SiO_2$ type, $ZnO$—$B_2O_3$ type, $BaO$—$CaO$—$Al_2O_3$ type, $PbO$—$B_2O_3$—$SiO_2$—$Al_2O_3$ type, $PbO$—$B_2O_3$—$ZnO$ type, $ZnO$—$B_2O_3$ type, $Bi_2O_3$—$B_2O_3$—$SiO_2$ type, $R'_2O$—$B_2O_3$—$SiO_2$ type (R' indicates an alkali metal element) and the like. If a vitreous composition with a high softening point is selected, oxidation and sintering will be suppressed before firing in the high-temperature region following binder removal; accordingly, the composition and amount of coating are determined in accordance with the firing conditions. Furthermore, components that improve the adhesion of the electrode films, platability, conductivity and the like by reacting with the molten glass powder (C) during firing may also be included in the composition.

As in the case of the above-mentioned spherical conductive powder (A), alloys containing copper as the chief component may also be used besides pure copper powders as the flaky conductive powder (B) comprising chiefly copper as specified in the present invention. Furthermore, powders in which a thin film of an oxidation-resistant metal such as nickel, cobalt, iron, zinc, tin, gold, silver, palladium, platinum, rhodium or the like, or an alloy of such metals, is formed on the surfaces of the flaky copper powder particles by a method such as plating, vapor deposition or the like, or powders on which a vitreous thin film similar to that of the spherical conductive powder (A) is formed, may also be used. As result of forming such a coating of metal or a vitreous thin film, the oxidation resistance is improved, so that firing can be performed at a higher oxygen partial pressure. Below, these powders will be referred to collectively as "flaky copper powders".

It is desirable to use a powder with an average particle diameter of 1.0 to 10.0 μm as the above-mentioned flaky copper powder. Here, the average particle diameter is the average value of the major axis of the flaky particles, and is the cumulative fraction 50% value ($D_{50}$) (based on the weight) of the particle size distribution measured using a laser diffraction particle size analyzer. By setting the average particle diameter in the above-mentioned range, it is possible to form the dry film of the conductive paste with a structure that allows easy venting of the decomposition products of the vehicle (converted into a gas during firing) to the outside of the film; furthermore, a good coating film shape can be obtained. If the average particle diameter is smaller than 1.0 μm, binder removal is insufficient, and blistering tends to occur; furthermore, the oxidation resistance drops. On the other hand, if the average particle diameter exceeds 10.0 μm, the fluidity of the paste drops, and coating into a good shape becomes impossible; furthermore, the porous structure formed during the drying of the film remains "as is" in the fired film, so that the electrodes tend to become porous.

Furthermore, in particular, if the ratio of the average particle diameter (μm) to the average thickness (am) of the flaky copper powder is set in the range of 3 to 80, or if the specific surface area is set in the range of 0.3 to 2.0 m²/g, a terminal electrode conductive paste which combines good coating compatibility and firing characteristics with an extremely superior binder removal effect can be obtained. If the ratio of the average particle diameter to the average thickness is smaller than 3, the binder removal characteristics are insufficient; on the other hand, if this ratio exceeds 80, the fluidity of the paste drops, so that it becomes difficult to form a coating with a good shape when coating is performed by dipping (e. g., projections are formed and the like). In addition, the electrodes tend to become porous, and the surface shows a tendency toward roughness. Moreover, the average thickness of the flaky powder can be determined by SEM observation. If the specific surface area is smaller than 0.3 m²/g, the electrode films obtained by firing tend to become porous; on the other hand, if this area exceeds 2.0 m²/g, the fluidity of the paste is insufficient, and the central portions of the terminal electrodes tend to form projections.

Such a flaky copper powder may be manufactured by any method. For example, a method in which a spherical powder is ground using a ball mill or the like, a chemical reduction method, a method in which a copper foil is crushed or the like may be used.

The mixture ratio of the above-mentioned spherical conductive powder and the above-mentioned flaky conductive powder can be appropriately determined in accordance with the materials used, the firing conditions and the required characteristics. Preferably, however, this ratio is in the range of 5:95 to 95:5 (weight ratio). If the ratio of the flaky conductive powder is smaller than this, the density of the dry film becomes excessively high, so that the binder removal characteristics deteriorate. On the other hand, if this range is exceeded, it conversely becomes difficult to vent the vehicle decomposition gases from the electrode films, so that the binder removal characteristics deteriorate; in addition, the diffusion of metals at high temperatures is insufficient, so that sintering is prevented.

Preferably, (A) and (B) are appropriately selected and mixed so that the dry film density $D(g/cm^3)$ calculated by the following formula is in the range of 3.0 to 4.8 g/cm³.

$$D=W/(\pi T\times 10^{-4})$$

Here, W and T are the weight (g) and thickness (μm) of the dry film after the conductive paste is applied as a coating to the surface of a PET film so that the resulting film thickness is approximately 250 Mm, this is dried for 10 minutes at 150° C. and then cut into a circular shape with a diameter of 20 mm, and the PET film is stripped away.

There are no particular restrictions on the glass powder (C) that is used, as long as this powder can be used as an inorganic binder in an ordinary terminal electrode copper paste. In particular, reduction-resistant glasses that contain no easily reduced components such as lead or the like, e. g., $BaO$—$ZnO$—$B_2O_3$ type, $RO$—$ZnO$—$B_2O_3$—$MnO_2$ type, $RO$—$ZnO$ type, $RO$—$ZnO$—$MnO_2$ type, $RO$—$ZnO$—$SiO_2$ type, $ZnO$—$B_2O_3$ type and $SiO_2$—$B_2O_3$—$R'_2O$ type glasses and the like (R indicates an alkaline earth metal and R' indicates an alkali metal) are desirable for use. The amount of this glass powder that is mixed is approximately 1 to 20 parts by weight per 100 parts by weight of the conductive powder. In cases where the amount used is less than 1 wt part, the adhesive strength between the ceramic body of the above-mentioned laminate electronic part and the terminal electrode decreases. On the other hand, in cases where this amount exceeds 20 parts by weight, the glass is distributed in large amounts on the electrode surface following firing, so that fusion between chips may occur, and so that plating on the terminal electrodes becomes difficult.

Besides ordinary methods in which the raw material compounds of the respective components are mixed, melted, rapidly cooled and pulverized, the glass powder may also be obtained by any other desired method such as a sol-gel method, spray pyrolysis method, atomization method or the like. Especially in the case of a spray pyrolysis method, a spherical glass powder with a fine uniform particle size can be obtained, so that there is no need to perform a pulverization treatment when this is used in the conductive paste. Accordingly, such a method is desirable.

The conductive paste of the present invention may also contain various inorganic additives such as ordinarily used metal oxides, clay minerals, ceramics, oxidizing agents and the like, as well as other conductive powders, in amounts that cause no loss of the effect of the present invention.

There are likewise no particular restrictions on the organic vehicle (D); an ordinarily used organic binder such as acrylic type resin, cellulose type resin or the like dissolved or dispersed in an organic solvent may be appropriately selected and used. If necessary, plasticizers, dispersing agents, viscosity adjusting agents, surfactants, oxidizing agents, organometalic compounds and the like may also be added. There are likewise no restrictions on the mixture ratio of the vehicle; the amount used is an appropriate amount for holding the inorganic components in the paste, and this may be appropriately adjusted in accordance with the applying method.

Various amines can be used as the aliphatic amine (E), e. g., primary amines such as octylamine, laurylamine, myristylamine, stearylamine, oleylamie, beef tallow amine, beef tallow propylenediamine and the like, secondary amines such as distearylamine and the like, and tertiary amines such as triethylamine, dimethyloctylamine, dimethylmyristylamine, dimethylpalmitylamine, dimethylstearylamine, dimethylbehenylamine, dimethyllaurylamine, trioctylamine and the like. Two or more of these amines may be used in combination. Mixtures of a plurality of different types of amines ordinarily marketed as "aliphatic amines" may also be used. In particular, from the standpoints of the ease of performing a coating treatment on the flaky copper powder described later, and adsorption with metals, higher alkylamines with approximately 14 to 18 carbon atoms in the main chains, such as stearylamine, oleylamine, dimethylstearylamine or the like, or aliphatic amines comprising chiefly such amines, are especially desirable for use.

The aliphatic amine is preferably used by being applied as a coating treatment and adsorbed beforehand on the surfaces of the flaky copper powder. There are no particular restrictions on the coating method used; for example, this amine can be used alone or can be dissolved in a solvent, and the surfaces of the copper powder can be subjected to a surface treatment by the same method used for ordinary surface treatment agents. Furthermore, in cases where the flaky copper powder is manufactured by grinding a spherical or granular copper powder, the aliphatic amine can be used as a grinding aid, and can be mixed with the paste while adsorbed "as is" on the powder surfaces.

The aliphatic amine prevents oxidation of the flaky copper powder, and improves the dispersibility of the powder in the paste. Conventionally, higher fatty acids such as stearic acid, lauric acid and the like, or metal salts of such acids, have ordinarily been used for such purposes. However, under ordinary reducing firing conditions, these fatty acids contained in copper pastes are extremely resistant to decomposition and scattering, so that even after the vehicle component has completed decomposition, such fatty acids remain up to high temperatures of 700 to 800° C. According to research conducted by the present inventors, it appears that this is due to the following: namely, higher fatty acids adhere strongly to the copper powder surfaces as a result of forming a metal soap with copper, so that these substances tend not to decompose at low temperatures in an atmosphere that contains extremely little oxygen. Accordingly, even if the removal of the vehicle is improved, the fatty acids remain in the film as residual carbon, and begin to decompose only after the film begins to be sintered. Consequently, this impedes sintering, and causes blistering and deterioration of the ceramic body, as well as increased process dependence. On the other hand, aliphatic amines have a superior antioxidation effect and effect as a dispersing agent, and also do not form compounds that bond strongly with copper, so that these compounds are easily decomposed and removed from the electrode film even in a non-oxidizing atmosphere at low temperatures.

The amount of aliphatic amine that is mixed in the composition is preferably 0.05 to 2.0 wt % relative to the weight the flaky copper powder. If this amount mixed is less than 0.05 wt %, the effect is insufficient; on the other hand, even if an amount exceeding 2.0 wt % is mixed, there is no additional improvement.

In the paste of the present invention, as a result of mixing the above-mentioned components, it is surmised that the structure of the dry film can be maintained in a porous state that is optimal for binder removal, so that binder removal can be smoothly performed in structural terms. Accordingly, binder removal can be performed very quickly without oxidation of the copper prior to softening the glass and sintering the copper, so that the amount of residual carbon that remains shut into the film up to a high temperature region can be minimized.

Next, sintering gradually proceeds, and the structure becomes denser and finer. According to research conducted by the present inventors, the oxygen partial pressure at which there is no oxidation of the copper at the peak temperature during firing, e. g., 800° C., is $10^{-3}$ ppm or less. At this point in time, in order to maintain such a low oxygen partial pressure at this temperature, the amount of residual carbon is not zero; it appears that it is necessary that an extremely small amount of carbon remain locally in the vicinity of the copper powder, so that an environment that consumes the oxygen is formed. However, leaving such an extremely small controlled amount of carbon has been extremely difficult in the past, whether the binder removal process is performed in an oxidizing atmosphere or an atmosphere with extremely little oxygen. On the other hand, in the examples described below, according to finding confirmed by the present inventors, residual carbon is present in the vicinity of the copper powder in an extremely small and controlled amount in the high-temperature region in the case of the paste of the present invention shown in the examples. As a result of the presence of this carbon, it appears that a locally low oxygen partial pressure can be maintained in the vicinity of the copper powder even at a high temperature close to the maximum firing temperature, so that the oxidation of copper can be prevented.

Furthermore, since such ideal sintering behavior can be shown, and since a controlled atmosphere can be created, it appears that the susceptibility to the firing conditions is also low. In particular, the amount of carbon remaining up to the high-temperature region is stable, so that the process dependency is small, even in cases where a spherical copper powder and a flaky copper powder are combined so that the filling characteristics of the dry film are high.

EXAMPLES

Preparation of Samples 1 Through 9

The respective compositions shown in Table 1 were mixed using a spherical copper powder with an average particle diameter of 2 μm having a uniform $BaO$—$SiO_2$ type vitreous thin film with an average thickness of 13 nm on the powder particle surfaces (vitreous thin film in powder: approximately 2 wt %) as the glass-coated spherical copper powder, a flaky copper powder with an average particle diameter of 7 μm and an average thickness of 0.2 μm surface-treated with an aliphatic amine ("FARMIN 80" manufactured by Kao Corporation) consisting chiefly of stearylamine as the flaky copper powder (amount of stearylamine relative to flaky copper powder: approximately 0.3 wt %), a $BaO$—$ZnO$—$B_2O_3$ type spherical glass powder with an average particle diameter of 2 μm or a $ZnO$—$B_2O_3$—$SiO_2$ type spherical glass powder with an average particle diameter of 2 μm as the glass powder, and a solution obtained by dissolving an acrylic resin in terpineol as the organic vehicle, and conductive pastes were manufactured by kneading using a three-roll mill. Samples 6 through 9 are outside the range of the present invention. Furthermore, in samples 8 and 9, a spherical copper powder with an average particle diameter of 2 μm having no vitreous thin film was used instead of the spherical copper powder covered with the vitreous thin film.

Test 1

A Y5V 1 μF (rated value) multilayer ceramic capacitor body with plane dimensions of 2.0 mm×1.25 mm and a thickness of 1.25 mm obtained by sintering a laminate of barium titanate ceramic dielectric green sheets and nickel internal electrodes at a high temperature was prepared, and the conductive pastes of samples 1 through 9 were applied by dipping to both end surfaces where the nickel internal electrodes of the capacitor body were exposed so that the film thickness after firing was 60 μm, and these samples were dried by being held for 10 minutes at 150° C. in a hot air draft drier.

Next, in a belt type muffle furnace, the entire region of the firing atmosphere (binder removal zone and firing zone) was passed through a solder reflow furnace, and the number of samples showing the phenomenon of molten solder scattering into the surrounding area was investigated.

Thermal shock test: the samples were immersed for 7 seconds in a solder bath at 330° C., and the number of samples showing thermal cracking (among 30 samples) was investigated.

TABLE 1

|  | Sample Number | | | | | | | | |
| --- | --- | --- | --- | --- | --- | --- | --- | --- | --- |
|  | 1 | 2 | 3 | 4 | 5 | 6* | 7* | 8* | 9* |
| Spherical copper powder coated with vitreous thin film (parts by weight) | 50 | 50 | 90 | 30 | 10 | 0 | 100 | — | — |
| Spherical copper powder without vitreous thin film (parts by weight) | — | — | — | — | — | — | — | 30 | 50 |
| Flaky copper powder (parts by weight) | 50 | 50 | 10 | 70 | 90 | 100 | 0 | 70 | 50 |
| BaO—ZnO—$B_2O_3$ type glass powder (parts by weight) | 6 | — | 4 | 8 | 8 | 12 | 4 | 8 | — |
| ZnO—$B_2O_3$—$SiO_2$ type glass powder (parts by weight) | — | 6 | — | — | — | — | — | — | 6 |
| Organic vechile (parts by weight) | 35 | 35 | 30 | 35 | 35 | 35 | 35 | 35 | 35 |
| $O_2$ concentration in firing atmosphere (ppm) (entire region) | 5 | 5 | 5 | 5 | 5 | 5 | 5 | 5 | 5 |
| Peak temperature (° C.) | 820 | 780 | 820 | 820 | 820 | 820 | 820 | 820 | 780 |
| Electrostatic capacity (μF) | 1.03 | 1.03 | 1.02 | 1.04 | 1.02 | 1.01 | 0.95 | 0.92 | 0.95 |
| Presence or absence of blistering | Absent | Absent | Absent | Absent | Absent | Absent | Present | Absent | Present |
| Platability | ⊙ | ○ | ⊙ | ○ | ⊙ | ○ | X | ○ | ○ |
| Tensile strength (kg) | 3.6 | 4.6 | 3.4 | 3.8 | 3.8 | 3.6 | 2.8 | 3.7 | 3.3 |
| Thermal cracking (among 30 samples) | 0 | 0 | 0 | 0 | 0 | 0 | 6 | 0 | 23 |
| Solder sputtering (among 30 samples) | 0 | 0 | 0 | 0 | 0 | 10 | 0 | 1 | 4 |

*Comparative Example set as a nitrogen atmosphere containing 5 ppm oxygen, and the samples were fired at the peak temperatures shown in Table 1 with the holding time at the peak temperature set at 10 minutes, and the time from the start to finish of firing set at 1 hour, thus forming terminal electrodes and obtained multilayer ceramic capacitors.

The electrostatic capacity was measured for the capacitors with terminal electrodes baked on under the respective conditions. Furthermore, the surfaces and cross sections of the terminal electrode films were observed with a scanning electron microscope (SEM), and the presence or absence of blistering was investigated.

Furthermore, the platability, terminal electrode tensile strength and presence or absence of solder sputtering were investigated for test samples in which nickel plating films were formed on the electrode films by electroplating, and tin plating films were further formed. Moreover, a thermal shock test was performed. The results are summarized in Table 1. Furthermore, the electrostatic capacity and tensile strength values shown are average values for 500 capacitors.

The platability was evaluated by means of the degree (%) of plated area to the electrode surfaces.

⊙: substantially 100%, ○: 90 to 99%, Δ: 70 to 89% adhesion, X: 69% or less.

Checking for the presence or absence of solder sputtering, and the thermal shock test, were performed as follows.

Solder sputtering: for 30 samples in which the terminal electrodes were covered with solder, the samples were As is clear from the results shown in Table 1, samples 1 through 4 which used a spherical copper powder with a vitreous thin film and a flaky copper powder in combination were superior in terms of all characteristics when compared to samples 6 and 7 using only one of these powders, or samples 8 and 9 using a spherical copper powder not coated with a vitreous thin film, and a flaky copper powder. In particular, samples 8 and 9 using a spherical powder not coated with a vitreous thin film show a low electrostatic capacity; this appears to be due to the oxidation of the copper powder.

Preparation of Samples 10 Through 15

The compositions shown in Table 2 were respectively mixed using the same materials as in samples 1 through 9, except that a flaky copper powder with an average particle diameter of 7 μm and an average thickness of 0.2 μm surface-treated with the amount of stearylamine (the above-mentioned "FARMIN 80") or stearic acid shown in Table 2 was used as the flaky copper powder, and conductive pastes were manufactured. Furthermore, sample 10 is a paste with the same composition as sample 4, sample 12 is a paste with the same composition as sample 8, and sample 15 is a paste with the same composition as sample 5.

Test 2

Using the conductive pastes of samples No. 10 through 15, the firing atmosphere was divided into a region reaching 600° C. in the temperature elevation process (binder removal zone) and a region with a temperature higher than 600° C. (firing zone), and the respective atmospheres were set in nitrogen atmospheres containing the amounts of oxygen shown in Table 2. Furthermore, the peak temperature was varied. Otherwise, capacitors were manufactured in the same manner as in test 1. The tests were performed, and the results obtained are shown in Table 2.

amount of stearylamine (the above-mentioned "FARMIN 80"), dimethylstearylamine ("FARMIN DM8098" manufactured by Kao Corporation) or oleic acid shown in Table 3 was used as the flaky copper powder. Furthermore, sample 18 is a comparative example outside the scope of the present invention.

TABLE 2

| | Sample No. | | | | | | | | | | | | | |
|---|---|---|---|---|---|---|---|---|---|---|---|---|---|---|
| | 10 | | 11 | | 12* | | 13 | | | 14 | | | 15 | |
| Spherical copper powder coated with vitreous thin film (parts by weight) | 30 | | 30 | | — | | 30 | | | 30 | | | 10 | |
| Spherical copper powder without vitreous thin film (parts by weight) | — | | — | | 30 | | — | | | — | | | — | |
| Flaky copper powder (parts by weight) | 70 | | 70 | | 70 | | 70 | | | 70 | | | 90 | |
| Stearylamine (wt. %) | 0.3 | | — | | 0.3 | | 0.5 | | | — | | | 0.3 | |
| Stearic acid (wt. %) | — | | 0.3 | | — | | — | | | 0.5 | | | — | |
| BaO—ZnO—B$_2$O$_3$ type glass powder (parts by weight) | 8 | | 8 | | 8 | | — | | | — | | | 8 | |
| ZnO—B$_2$O$_3$—SiO$_2$ type glass powder (parts by weight) | — | | — | | — | | 10 | | | 10 | | | — | |
| Organic vehicle (parts by weight) | 35 | | 35 | | 35 | | 35 | | | 35 | | | 35 | |
| O$_2$ concentration in binder removal zone (ppm) | 5 | 20 | 5 | 20 | 5 | 20 | 20 | 50 | 20 | 20 | 50 | 20 | 1 | 1 |
| O$_2$ concentration in firing zone (ppm) | 5 | 20 | 5 | 20 | 5 | 20 | 5 | 5 | 20 | 5 | 5 | 20 | 1 | 1 |
| Peak temperature (° C.) | 820 | 820 | 820 | 820 | 820 | 820 | 780 | 780 | 780 | 780 | 780 | 780 | 800 | 840 |
| Electrostatic capacity (μF) | 1.04 | 1.04 | 1.00 | 1.02 | 0.92 | 0.76 | 1.02 | 1.01 | 1.01 | 1.00 | 1.02 | 1.00 | 1.04 | 1.03 |
| Presence or absence of blistering | Absent | Absent | Absent | Absent | Present | Absent | Absent | Absent | Absent | Present | Absent | Absent | Absent | Absent |
| Platability | ○ | ◎ | ○ | ○ | ○ | X | ○ | ○ | ○ | ○ | ○ | △ | ◎ | ◎ |
| Tensile strength (kg) | 3.8 | 3.9 | 3.4 | 3.6 | 3.7 | 2.2 | 4.9 | 4.8 | 4.9 | 4.4 | 4.8 | 4.6 | 3.8 | 3.6 |
| Thermal cracking (among 30 samples) | 0 | 0 | 18 | 0 | 0 | 0 | 0 | 0 | 0 | 15 | 0 | 1 | 0 | 0 |
| Solder sputtering (among 30 samples) | 0 | 0 | 1 | 0 | 1 | 10 | 0 | 0 | 0 | 0 | 0 | 0 | 0 | 0 |

*Comparative Example

Among samples 10, 11, 13, 14 and 15 using a spherical copper powder coated with a vitreous thin film and a flaky copper powder in combination, it is seen that samples 10, 13 and 15 in which the flaky copper powder was treated with stearylamine can form superior terminal electrodes, show little firing atmosphere dependence, and have a wide process window, both in cases where the binder removal process and high-temperature firing process were performed in an atmosphere containing several tens of ppm of oxygen, and in cases where these processes were performed in an atmosphere with an extremely low oxygen content of a few ppm or less. On the other hand, in regard to samples 11 and 14 in which the flaky copper powder was treated with stearic acid, the terminal electrode characteristics can be improved to some extent by adjusting the oxygen concentration in the firing atmosphere of the binder removal zone. Sample 12 is a comparative example using a spherical copper powder not coated with a vitreous thin film, and a flaky copper powder; here, satisfactory results were not obtained.

Preparation of Samples 16 Through 18

The compositions shown in Table 3 were respectively mixed, and conductive pastes were manufactured, using the same materials as in samples 1 through 9, except that a flaky copper powder with an average particle diameter of 5 μm and an average thickness of 0.2 μm surface-treated with the Test 3

Using the conductive pastes of samples No. 16 through 18, X7R 4.7 μF (rated value) capacitors were used as multilayer ceramic capacitor bodies, and capacitors were manufactured in the same manner as in Test 1, except that the firing atmosphere and peak temperature were set in a nitrogen atmosphere containing oxygen at the concentration shown in Table 3. The same tests as those in Test 1 were performed; the results are shown in Table 3.

TABLE 3

| | Sample No. | | |
|---|---|---|---|
| | 16 | 17 | 18* |
| Spherical copper powder coated with vitreous thin film (parts by weight) | 10 | 50 | — |
| Spherical copper powder without vitreous thin film (parts by weight) | — | — | 10 |
| Flaky copper powder (parts by weight) | 90 | 50 | 90 |
| Stearylamine (wt. %) | 0.5 | — | — |
| Dimethylstearylamine (wt. %) | — | 0.7 | — |
| Oleic acid (wt. %) | — | — | 0.5 |
| BaO—ZnO—B$_2$O$_3$ type glass powder (parts by weight) | 8 | 6 | 12 |
| Organic vehicle (parts by weight) | 35 | 35 | 35 |

TABLE 3-continued

| | Sample No. | | |
|---|---|---|---|
| | 16 | 17 | 18* |
| O$_2$ concentration in binder removal zone (ppm) | 20 | 5 | 20 |
| O$_2$ concentration in firing zone (ppm) | 5 | 5 | 5 |
| Peak temperature (° C.) | 820 | 820 | 820 |
| Electrostatic capacity (μF) | 4.8 | 4.8 | 4.0 |
| Presence or absence of blistering | Absent | Absent | Present |
| Platability | ◎ | ◎ | X |
| Tensile strength (kg) | 3.2 | 3.4 | 1.8 |
| Thermal cracking (among 30 samples) | 0 | 0 | 2 |
| Solder sputtering (among 30 samples) | 0 | 0 | 3 |

*Comparative Example

As is clear from the results shown in Table 3, samples 16 and 17 which used a spherical copper powder coated with a vitreous thin film and a flaky copper powder in combination are superior in terms of all characteristics compared to sample 18 which used a spherical copper powder not coated with a vitreous thin film, and a flaky copper powder.

What is claimed is:

1. A conductive paste for a terminal electrode of a multilayer ceramic electronic part, comprising (A) a spherical conductive powder which comprises chiefly copper, and which has a vitreous thin film on at least a portion of a surface thereof, (B) a flaky conductive powder comprising chiefly copper, (C) a glass powder, and (D) an organic vehicle.

2. The conductive paste according to claim 1, wherein a weight ratio of said (A) to (B) is in the range of 5:95 to 95:5.

3. A conductive paste for a terminal electrode of a multilayer ceramic electronic part, comprising (A) a spherical conductive powder which comprises chiefly copper, and which has a vitreous thin film on at least a portion of a surface thereof, (B) a flaky conductive powder comprising chiefly copper, (C) a glass powder, (D) an organic vehicle, and (E) an aliphatic amine.

4. The conductive paste according to claim 2, wherein at least a portion of said (E) aliphatic amine is adsorbed on a surface of the (B) flaky conductive powder particles.

5. The conductive paste according to claim 2, wherein the amount of said (E) aliphatic amine that is mixed is 0.05 to 2.0 wt % based on the weight of the (B) flaky conductive powder.

6. The conductive paste according to claim 2, wherein a weight ratio of said (A) to (B) is in the range of 5:95 to 95:5.

* * * * *